United States Patent [19]

Hirose

[11] Patent Number: 5,435,499
[45] Date of Patent: Jul. 25, 1995

[54] PHOTOGRAPHIC FILM CASSETTE
[75] Inventor: Masuhiko Hirose, Kanagawa, Japan
[73] Assignee: Fuji Photo Film Co., Ltd., Kanagawa, Japan
[21] Appl. No.: 685,788
[22] Filed: Apr. 16, 1991
[30] Foreign Application Priority Data Apr. 20, 1990 [JP] Japan ................. 2-105850
Jul. 5, 1990 [JP] Japan ................. 2-177973

[51] Int. Cl.⁶ ............................................. G03B 17/26
[52] U.S. Cl. .................................. 242/348.4; 354/275
[58] Field of Search ............ 242/71.1, 71.2, 348.4, 242/538.4, 539; 354/275, 277; 206/409

[56] References Cited

U.S. PATENT DOCUMENTS

| | | | |
|---|---|---|---|
| 2,329,228 | 9/1943 | Stiffler | 354/277 |
| 2,336,278 | 12/1943 | Mihalyi | |
| 2,360,255 | 10/1944 | Mihalyi | |
| 2,364,381 | 12/1944 | Mihalyi | |
| 2,521,935 | 9/1950 | Monroe | |
| 2,552,200 | 5/1951 | Mihalyi | |
| 3,467,340 | 9/1969 | Rosenburgh | 242/197 |
| 3,556,435 | 1/1971 | Wangerin | 242/210 |
| 3,627,229 | 12/1971 | Wangerin | 242/210 |
| 3,627,230 | 12/1971 | Wangerin | 242/210 |
| 3,677,499 | 7/1972 | Wangerin | 242/210 |
| 3,797,777 | 3/1974 | Hosono et al. | 242/197 |
| 3,953,870 | 4/1976 | Stolper | 354/277 |
| 4,616,914 | 10/1986 | Buelens et al. | 242/71.1 |
| 4,832,275 | 5/1989 | Robertson | 242/71.1 |
| 4,834,306 | 5/1989 | Robertson et al. | 242/71.1 |
| 4,962,401 | 10/1990 | Takahashi | 242/71.1 |
| 4,984,016 | 1/1991 | Makino et al. | 242/71.1 X |
| 5,003,334 | 3/1991 | Pagano et al. | 354/275 |
| 5,031,853 | 7/1991 | Jensen | 242/71.1 |
| 5,112,003 | 5/1992 | Covington et al. | 242/71.1 |

FOREIGN PATENT DOCUMENTS

| | | |
|---|---|---|
| 2921379 | 11/1980 | Germany . |
| 60-211453 | 10/1985 | Japan . |
| 227334 | 1/1990 | Japan . |
| 63-124050 | 5/1991 | Japan . |

Primary Examiner—John M. Jillions
Attorney, Agent, or Firm—Sughrue, Mion, Zinn, Macpeak & Seas

[57] ABSTRACT

A cassette shell of a photographic film cassette has a film passageway through which negative film is fed. A light-shielding member is disposed across the film passageway, and is elastic and rectangular. A side of the light-shielding member parallel to a spool in the cassette is attached to an inside surface of the film passageway. Structure is provided for receiving at least a free side of the light-shielding member opposite the side that is attached. In a preferred embodiment, a second light-shielding member similar to the first light-shielding member is disposed across the film passageway outside the first light-shielding member. In this manner, the inside of the film passage mouth is shielded from light. The film leader is advanced reliably to the outside of the cassette shell by rotating the spool, in the case of a cassette provided with structure for advancing the film leader by rotating the spool. In another preferred embodiment, a fine nap is provided on interior surfaces of the two light-shielding members. Light is trapped by the nap, while the nap prevents the negative film from being scratched by contact with the light-shielding members.

31 Claims, 10 Drawing Sheets

PHOTOGRAPHIC FILM CASSETTE

BACKGROUND OF THE INVENTION

The present invention relates to a photographic film cassette, and more particularly to an improvement in the light-shielding capability of a film passageway of a film cassette.

Recently, as disclosed in U.S. Pat. Nos. 4,832,275 and 4,834,306, a photographic film cassette has been proposed in which rotation of a spool can advance a film leader of photographic film, e.g. negative film wound therein, to the outside of a cassette shell through a film passageway. When such a cassette is in an unused condition, no film protrudes outside of the cassette. If plush or light trapping fabric is used in a conventional manner to shield the film passageway from light, such plush is provided with densely planted long pile threads. Alternatively, it is necessary to provide the film passageway with a light-shielding construction.

Japanese Patent Laid-open Publication No. 60-211453 discloses a cassette with a film passageway shielded from light, in which a plurality of elastic ribs are formed on the inside walls of the film passageway along a widthwise direction of the film. These ribs serve to reinforce the inside walls of the film passageway so that it is possible to prevent the film from being subjected to light by deforming the inside walls of the film passageway. Further, two or three pairs of light-shielding elastic members are attached to the inside walls of the film passageway so that one lengthwise side (attached side) is attached, and the thickness decreases slightly along the direction from the attached side to a side (free side) opposite the attached side. The overall elasticity of the light-shielding members is utilized effectively based on the decrease in thickness, so that it is possible to bring the tips of the light-shielding members in contact together reliably after winding up the film.

In a magazine for containing a photosensitive material as disclosed in Japanese Patent Laid-open Publication No. 63-124050, a light-shielding elastic plate is provided in a film passageway of a magazine casing to cover the whole length of the film passageway. The smooth edge of the elastic plate, crooked in the shape of a letter J, presses the film against the plush when the film is fed. The light-shielding capacity thus is improved without being affected by a degree of precision in sizes or gaps.

Figure 18:
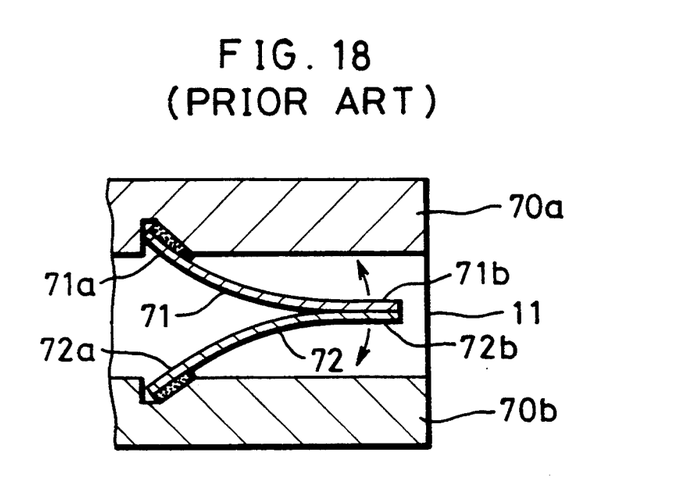
FIG. 18 is a sectional view of an important portion of a film passageway of a conventional film cassette.

In a photographic film magazine as disclosed in Japanese Patent Laid-open Publication No. 2-27334, light-shielding elastic members 71 and 72 are attached to parallel tongues 70a and 70b forming a film passage mouth 11, as illustrated in FIG. 18. Attached sides 71a and 72a of the light-shielding members 71 and 72 are attached so that opposite or free sides 71b and 72b are kept in contact to close the film passage mouth 11.

In the cassette disclosed in U.S. Pat. Nos. 4,832,275 and 4,834,306, plush provided with long pile threads densely planted, causes considerable resistance against a film leader when the leader is advanced. The torque applied to the spool needs to be large, while possibly causing the film leader to jam.

The above-described light-shielding structures of the film passageway, though suitable for the magazine of a large size, are difficult to use for the film passageway of a 135-type film cassette with 35 mm photographic film wound in a roll. In the cassette disclosed in Japanese Patent Laid-open Publication No. 60-211453, gaps will be formed between lateral sides of the light-shielding members and the inside walls of the film passageway, thus adversely affecting light-shielding capacity. Supposedly, it also is difficult for the advancing film leader to push open the four or six light-shielding members which are disposed to lap one over another in the film passage mouth.

In the magazine disclosed in Japanese Patent Laid-open Publication No. 63-124050, gaps also might be formed between lateral sides of the light-shielding plate and the inside walls of the film passageway, while the light-shielding plate might be bent and upturned beyond the range of its elasticity and thus allow light to enter the magazine. The film leader advanced by the rotation of the spool might not be fed between the plush and the J-shaped tip of the light-shielding plate, as the tip is firmly pressed against the plush. This light-shielding plate cannot be applied to a self-advancing film cassette.

In the magazine disclosed in Japanese Patent Laid-open Publication No. 2-27334, the two light-shielding members need a large resilient force to keep their free sides in tight contact, because the film passage mouth is closed by the contact of the free sides. However, it is difficult to advance the film leader against the resilient force of the light-shielding members. When the film is protruded for a long time, the free sides will be irrecoverably deformed so as to be no longer in mutual contact after even rewinding the film, so that the light-shielding capacity decreases, no matter how high the resilient force is. Because the inside surfaces of the film passageway are parallel to each other, the possibly curled film leader might be stopped by the attaching side 72a of the light-shielding member 72, thus making impossible the full advance of the film leader.

SUMMARY OF THE INVENTION

In view of the foregoing, it is one object of the present invention to provide a photographic film cassette capable of shielding the inside of a film passage mouth reliably from light.

It is another object of the present invention to provide a photographic film cassette capable of advancing a film leader outside a cassette shell by rotating a spool, where the cassette is provided with structure for advancing the film leader by rotating the spool.

In order to achieve the above and other objects and advantages, the inventive photographic film cassette is constituted by a cassette shell having a film passageway through which the film is fed; a spool, disposed rotatably within the cassette shell, on which the film is wound; a first light-shielding member disposed across the film passageway for shielding an inside of the cassette shell from light, the first light-shielding member being elastic and substantially rectangular, wherein a side parallel to the spool is attached to an inside surface of the film passageway; and structure for receiving at least a free side of the first light-shielding member opposite the attached side.

According to a preferred embodiment, a second light-shielding member is disposed across the film passageway beside the first light-shielding member for shielding an inside of the cassette shell from light, the second light-shielding member being elastic and substantially rectangular, of which a side parallel to the spool is attached to one of the inside surfaces of the film passageway.

According to another preferred embodiment, additional structure is attached to interior surfaces of the first and second light-shielding members with respect to the film passageway for trapping light and for protecting the film.

The inside of the film passage mouth is shielded from light, while the film leader is advanced reliably outside the cassette shell by rotating the spool, where the cassette is provided with structure for advancing the film leader by rotating the spool.

BRIEF DESCRIPTION OF THE DRAWINGS

The above and other objects and advantages of the present invention will become more apparent from the following detailed description when read in connection with the accompanying drawings, in which.

DETAILED DESCRIPTION OF THE PREFERRED EMBODIMENTS

Figure 1:
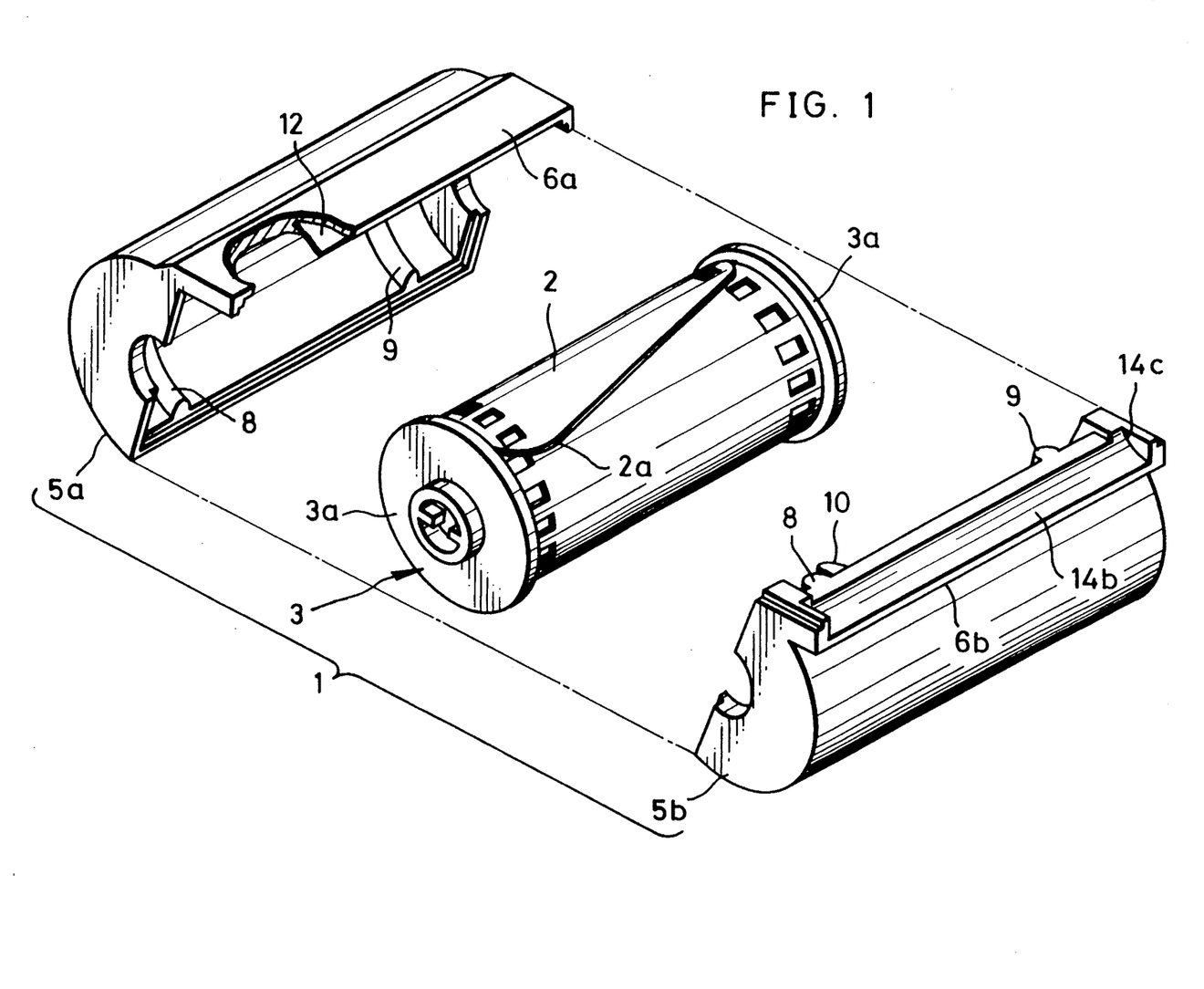
FIG. 1 is an exploded perspective view of a photographic film cassette according to a preferred embodiment of the present invention.
Figure 2:
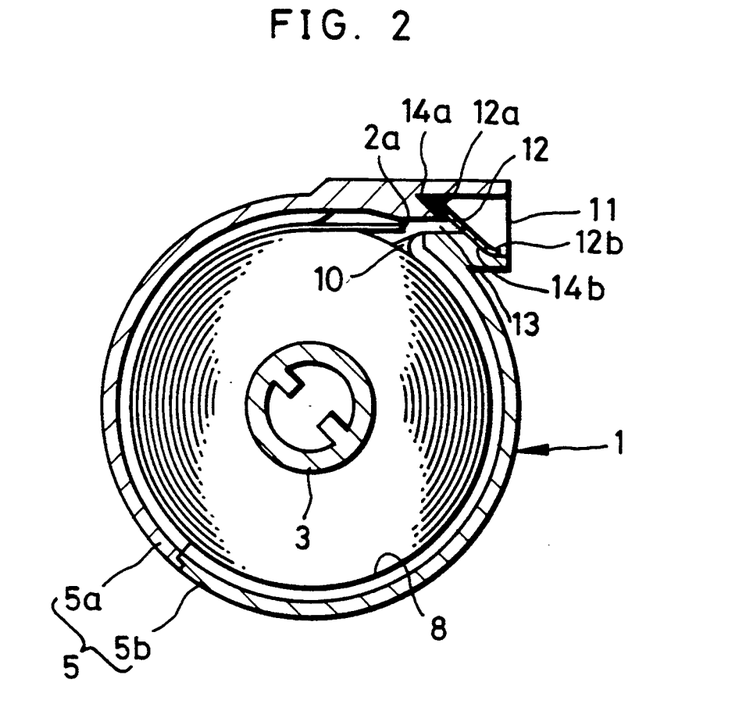
FIG. 2 is a sectional view of the cassette of FIG. 1 under a condition with photographic film wound therein.

In FIGS. 1 and 2 showing a photographic film cassette 1 in accordance with the present invention, 135-type photographic film, e.g. negative film 2 is wound on a spool 3 having flanges 3a therebetween to form a film roll. The trailing end of the negative film 2 is attached to the spool 3, which is contained rotatably in a cassette shell 5, which in turn is constituted by an upper shell half 5a and a lower shell half 5b both molded from plastics. Upper and lower tongues 6a and 6b are formed integrally on respective shell halves 5a and 5b. When the shell halves 5a and 5b are joined together, the tongues 6a and 6b define a film passageway therebetween.

Annular ridges 8 and 9 are formed integrally on the shell halves 5a and 5b on respective interior surfaces thereof. The ridges 8 and 9, which contact the outermost turn of the negative film 2 wound in a roll in the position of lengthwise arranged perforations of the negative film 2, prevent the negative film 2 from loosening around the spool 3, and reduce contact resistance during rotation of the negative film 2 in the cassette shell 5. A separation claw 10, provided in an entrance of the film passageway beside the ridge 8 attaining the lower tongue 6b, serves to separate a leading end 2a of the negative film 2 from the roll film 2 in order to direct it to a film passage mouth 11 or the exit of the film passageway. It is noted that the leading end 2a has a shape projecting in a position deviating widthwise from the middle of the negative film 2. The separation claw 10 is formed in a position to contact the leading end 2a inside the perforation train to prevent engagement with the perforations.

On both upper and lower inside surfaces of the film passageway of the cassette 1, a stepped portion is defined by an attaching surface 14a and a receiving surface 14b formed thereon, as will be described later in detail. A narrowed spacing 13, defined inside the attaching surface 14a and the receiving surface 14b, is provided with an elastic light-shielding member 12 fixed on the front side of the narrowed spacing 13 to prevent light from entering the narrowed spacing 13.

Various materials with elastic and light-shielding properties can serve as the light-shielding members 12. Appropriate materials include plastic film provided with a light-shielding property, such as polyethylene terephthalate (PET), high density polyethylene (HDPE), medium density polyethylene (MDPE), low density polyethylene CLDPE), and polystyrene (PS) in an unstretched, uniaxially stretched, or biaxially stretched state. There are various methods for providing the plastic film with a light-shielding property: mixing a light-shielding pigment, such as carbon black, with the plastic film; applying the light-shielding pigment to the plastic film; laminating the plastic film with a thin film of light-shielding pigment; and laminating the plastic film with a thin film of a light-shielding metal, such as aluminum. The elasticity of the light-shielding member is determined to be larger than that which would allow it to be drawn toward the entrance of the film passageway together with the negative film being rewound, and smaller than that which would allow stopping the leading end of the negative film from advancing.

Figure 3:
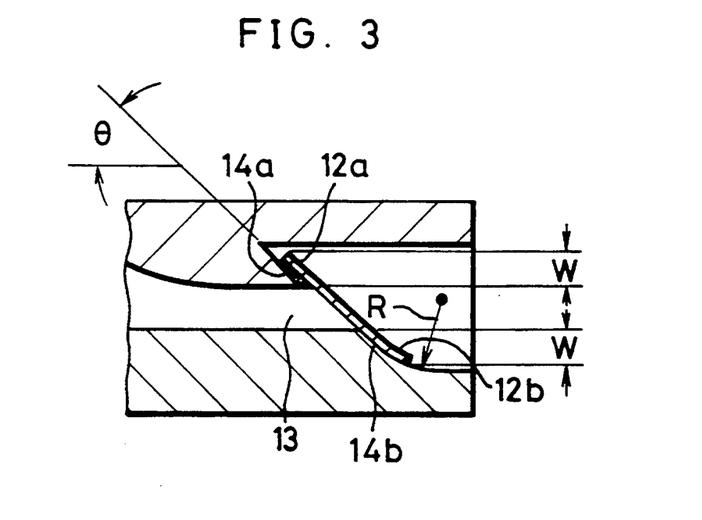
FIG. 3 is a sectional view of an important portion of a film passageway of the cassette of FIG. 1.
Figure 4:
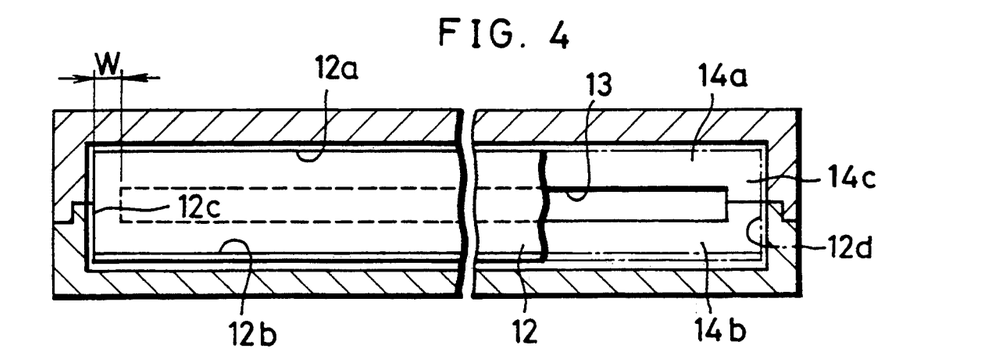
FIG. 4 is an explanatory view schematically showing the film passageway shown in FIG. 3.

As shown in detail in FIGS. 3 and 4, the light-shielding member 12 is attached to the inside of the film passageway by adhering an upper side 12a of the light-shielding member 12 to the attaching surface 14a formed at an angle on the inside surface of the upper tongue 6a so as to cover the narrowed spacing 13 completely from the outside. A lower side 12b or free side of the light-shielding member 12 is in contact with the receiving surface 14b formed at an angle on the inside surface of the lower tongue 6b. Lateral sides 12c and 12d of the lightshielding member 12 are similarly in contact with lateral receiving surfaces 14c formed on lateral ends of the attaching surface 14a and the receiving surface 14b. The light-shielding member 12 laps over the attaching surface 14a, the receiving surface 14b and the lateral receiving surfaces 14c in a common width W. The width W is preferably 0.5 mm or more. If gaps are defined between the light-shielding member 12 and the receiving surfaces 14b and 14c, such gaps preferably would be 0.2 mm or less.

Figure 5:
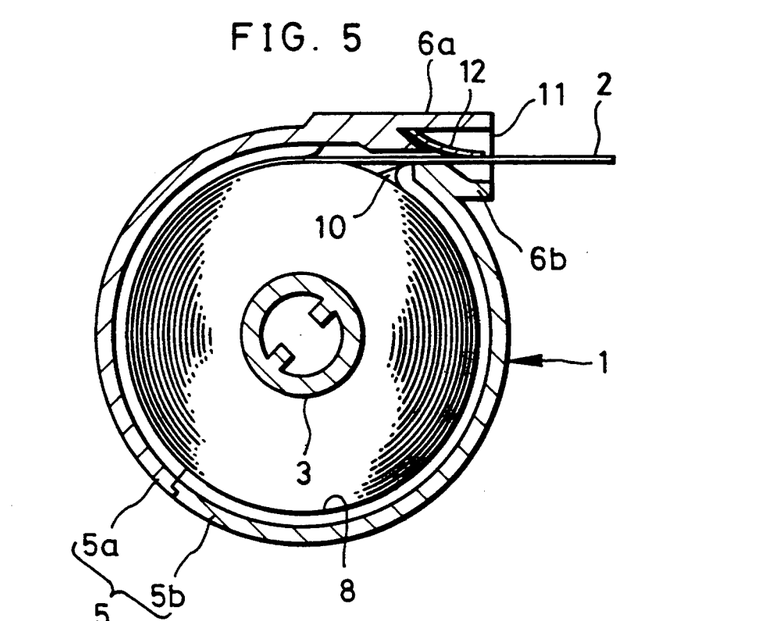
FIG. 5 is a sectional view of the cassette shown in FIG. 1 under a condition of advancing film.

The light-shielding member 12 is deformed by the leading end 2a when the leading end 2a is directed toward the film passage mouth 11 by the rotation of the spool 3, as shown in FIG. 5. The resistant force of the light-shielding member 12 received by the leading end 2a when advanced must be smaller than the force of advancing the negative film 2. After advancing the leading end 2a through the narrowed spacing 13, the back surface of the negative film 2 is in constant contact with the light-shielding member 12. Therefore, it is preferable to provide the light-shielding member 12 with appropriate lubrication. Lubricant such as silicone oil preferably is included in the light-shielding member 12, while it is also preferable to include lubricant in the base material of the negative film 2.

To reduce the resistance against advancing the leading end 2a, it is effective to reduce the angle $\theta$ of inclination of the light-shielding member 12, as shown in FIG. 3. However, the angle $\theta$ preferably is from 20° to 75°, taking into account the size of the cassette shell 5 and the light-shielding capacity of the light-shielding member 12, because the tongues 6a and 6b would be too long if the angle $\theta$ is excessively small. The bottom of the receiving surface 14b is formed to be a curve in an arc of a radius R of 2 mm for reliable contact of the lower side 12b of the light-shielding member 12 with the receiving surface 14b.

The operation of the above-constructed film cassette 1 now will be described. In the unused condition of the cassette 1, the leading end 2a is wound entirely within the cassette shell 5. Because the light-shielding member 12 is in contact with the receiving surface 14b and the lateral receiving surfaces 14c, the light entering through the film passage mouth 11 is shielded by the light-shielding member 12 so as to prevent it from entering the cassette shell 5 through the narrowed spacing 13. Clockwise rotation of the spool 3 also causes the roll film 2 to rotate. During rotation, the leading end 2a is separated from the roll film 2 by the separation claw 10, and is directed to the film passage mouth 11 through the entrance of the film passageway and the narrowed spacing 13. As shown in FIG. 5, the leading end 2a pushes open the light-shielding member 12 against its elasticity and advances through the film passage mouth 11. The free side or lower side 12b of the light shielding member 12 covers the narrowed spacing 13 at the angle $\theta$ with reference to the film passageway, so that little resistance is ever applied to the leading end 2a when the leading end is advanced.

The negative film 2 is fed, exposed in a camera, and wound up again in the cassette shell 5. When the leading end 2a is drawn back in the narrowed spacing 13, the light-shielding member 12 returns by means of elasticity and covers the narrowed spacing 13 in contact with the receiving surfaces 14b and 14c. The inside of the cassette shell 5 also is shielded completely from light after wind-up.

Figure 6:
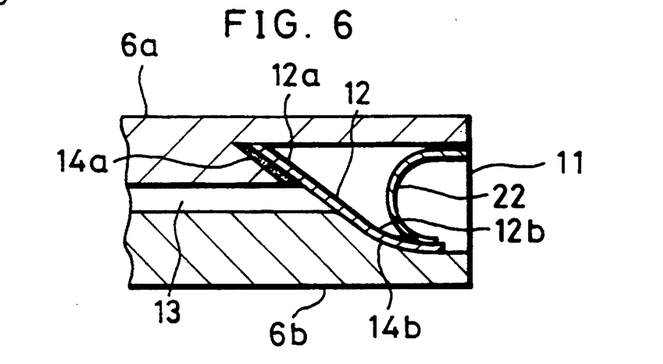
FIG. 6 is a sectional view of an important portion of a film passageway of a cassette according to another preferred embodiment of the present invention.

In FIG. 6, showing another preferred embodiment, a pressing member 22 made of the same material as the light-shielding member 12 is provided with the film passage mouth 11. The upper side of the pressing member 22 is attached to the inside surface of the upper tongue 6a. Its lower side is curved or crooked and presses the lower side of the light-shielding member 12 against the receiving surface 14b of the lower tongue 6b. The lower side or free side of the light-shielding member 12 is brought into reliable contact with the receiving surface 14b by the elasticity of the pressing member 22 so as to enhance the light-shielding capability. If the negative film 2 is left for long under a condition with the film leader drawn out, the light-shielding member 12 might undergo an irrecoverable curve or curl, but is pressed reliably by the pressing member 22 toward the narrowed spacing 13 when winding up the negative film 2 in the cassette shell 5. The length of the pressing member 22 along the direction parallel to the spool 3 can be equal to or greater than that of the narrowed spacing 13 so as to provide the pressing member 22 with the light-shielding function.

Figure 7:
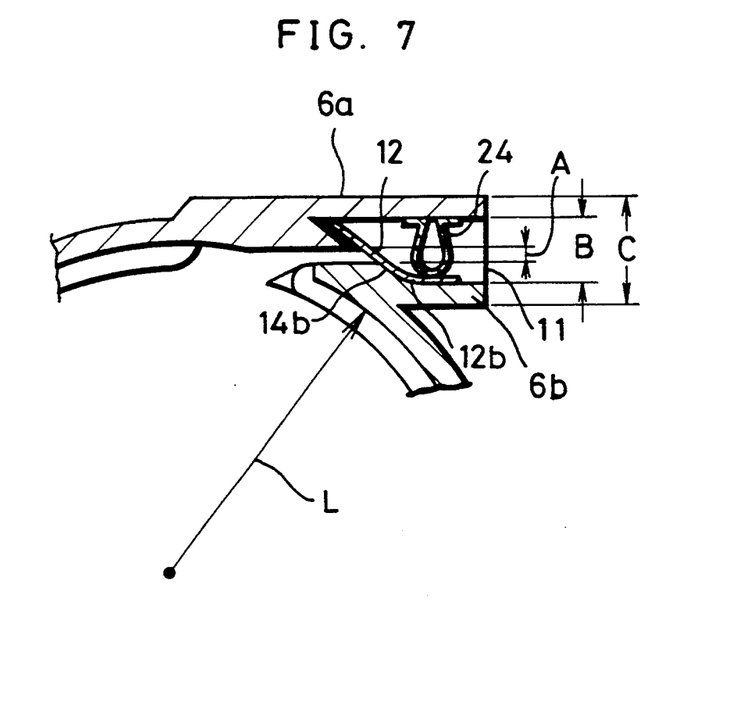
FIGS. 7 and 8 are a sectional view and a front view of an important portion of a sample cassette embodying the present invention for use in experiments.
Figure 8:
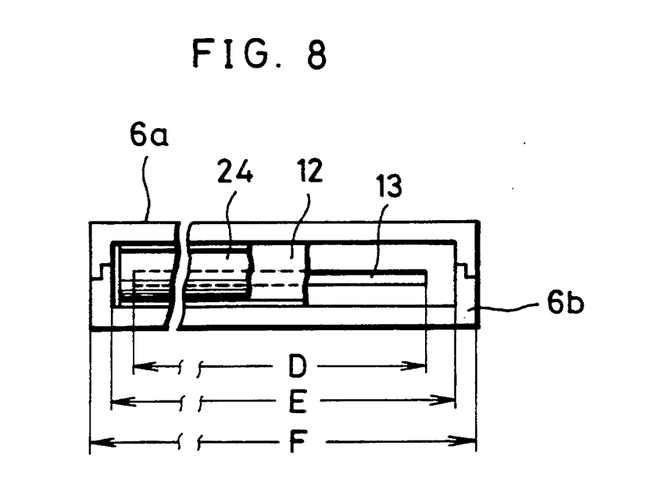

In order to conduct experiments, ten film cassettes having the film passageway in the shape shown in FIGS. 7 and 8 were made as a sample according to the present invention. The cassette shell 5 of this sample was molded from high-impact polystyrene (HIPS) including 5% by weight of carbon black. The detailed lengths of the designed size were determined as L=10 mm, A=1 mm, B=5 mm and C=8 mm, wherein L is the radius of the interior circumference of cylindrical body of the cassette shell 5, A is the interval defined in the narrowed spacing 13, and B and C are the inside and outside widths of the film passage mouth 11. It was also determined that D=35.5 mm, E=38.5 mm, and F=41 mm, wherein D is the width of the narrowed spacing 13, and E and F are inside and outside lengths of the film passage mouth 11. R, indicated in FIG. 3, was determined to be 2 mm for curving the lower side 12b of the light-shielding member 12.

In order to bring the lower side 12b into firm contact with the receiving surface 14b, a pressing member 24 made from the same plastic film material as the light-shielding member 12 was attached to the inside surface of the upper tongue 6a in the shape of the letter "omega". The light-shielding member 12 and the pressing member 24 were made from material of biaxially stretched PET film with 8% by weight of carbon black included therein. The light-shielding member 12 was 60 microns thick, 38 mm long, and 10 mm wide. The pressing member 24 had the same length and was 50 microns thick. The cassette shell 5 contained 24 exposures of 135-type film.

Figure 9:
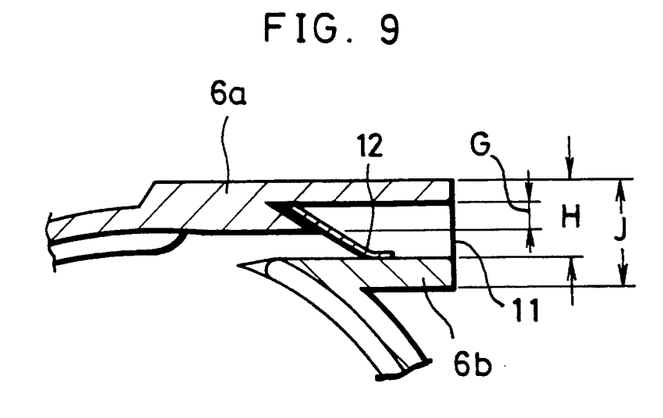
FIG. 9 is a sectional view of an important portion of a comparative cassette compared with the sample cassette of FIGS. 7 and 8.

As a comparative example, film cassettes were made having the film passageway lacking the receiving surface 14b receiving the free side 12b as shown in FIG. 9, in which the lengths G, H and J were determined to be respectively 2 mm, 5 mm and 7 mm. The detailed lengths along the direction parallel to the spool 3 were determined to be the same as the sample.

The ten sample cassettes and the comparative cassettes were loaded in cameras. Twelve exposures were effected for each cassette, after which the cassettes were left for one month. The negative film was wound up in the cassette shell until the leading end. The cassettes were unloaded from the cameras and subjected to the light of 80,000 lux (an illuminance generally corresponding to a midsummer outdoor scene) for 30 seconds. The film from the cassettes was developed. No fogging was detected on any film of the ten sample cassettes, while apparent fogging was recognized on the film of the comparative cassettes on the five or six outer turns of the film wound on the spool.

From the results of these experiments, it has been inferred that irrecoverable deformation tends to be produced on the light-shielding member 12 with time, so that eventually there might be a spacing between the free side 12b and the inside surface of the lower tongue 6b lacking the receiving surface 14b. Thus, it is advantageous to form the receiving surface 14b for contact with the free side 12b of the light-shielding member 12 so that the light-shielding member 12 can cover the narrowed spacing 13 sufficiently, even when the light-shielding member 12 is rather deformed.

Figure 10:
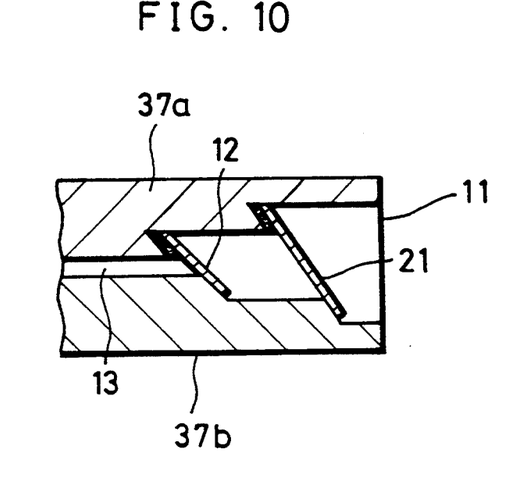
FIG. 10 is a sectional view of a construction of an important portion of a film passageway according to a further preferred embodiment of the present invention.
Figure 11:
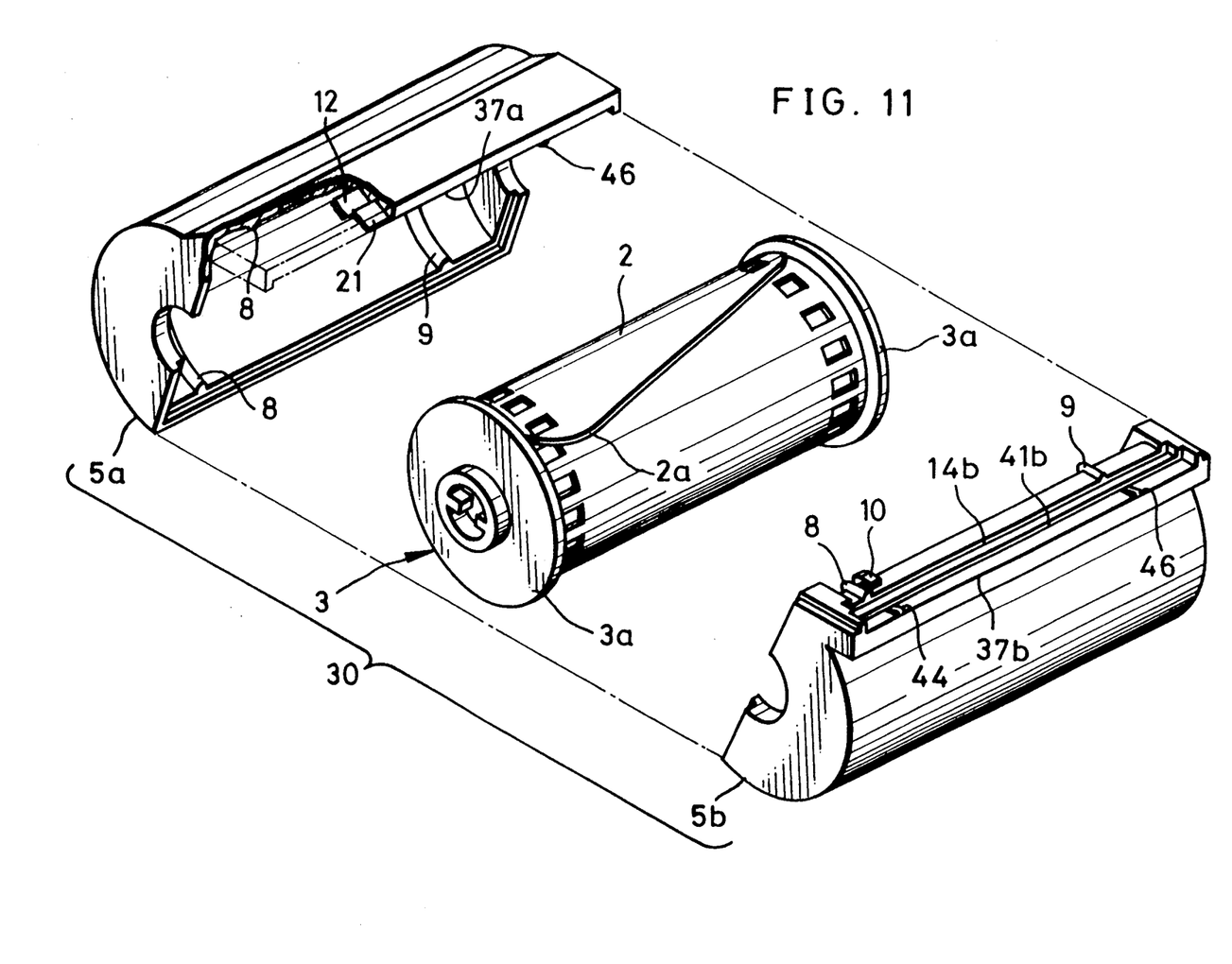
FIG. 11 is an exploded perspective view of a film cassette provided with a film passageway constructed as shown in FIG. 10.
Figure 12:
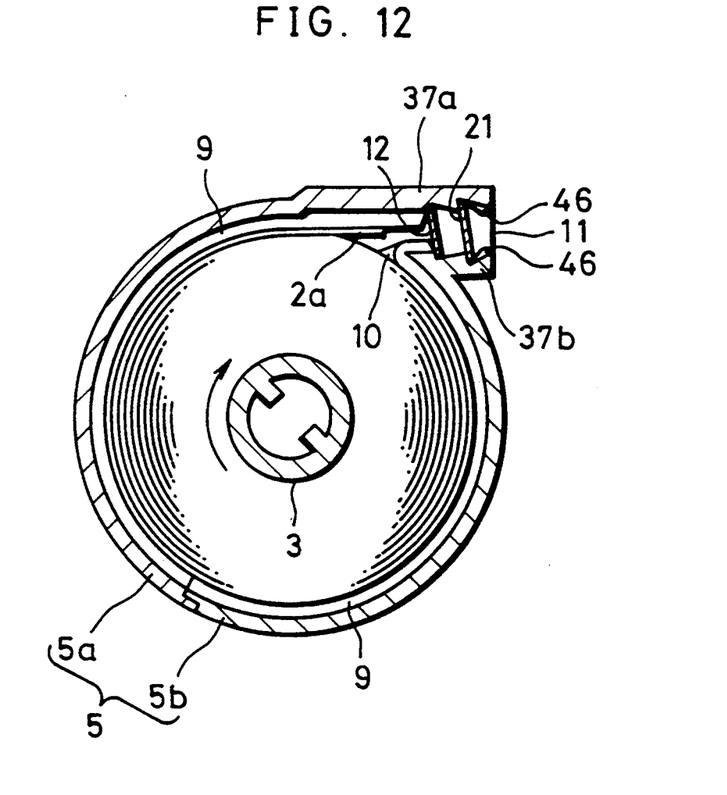
FIG. 12 is a sectional view of the cassette shown in FIG. 11 under a condition with the film wound therein.

In FIG. 10, showing still another preferred embodiment, a second light-shielding member 21 is provided in the film passageway similarly to the first light-shielding member 12, at an angle so as to lower resistance against advancement of the leading end 2a. FIGS. 11 and 12 show in detail a film cassette 30 constructed in this manner. A lower tongue 37b of the lower shell half 5b has a separation claw 10 and two receiving surfaces 14b and 41b. The film passageway is narrowed at the receiving surfaces 14b and 41b so as to improve the light-shielding capacity of the film passageway. The annular ridges 8 and 9 are formed on the interior surface of the shell halves 5a and 5b. Ridges 44 and 46 like the annular ridges 8 and 9 are formed on tongues 37a and 37b on the film passage month 11 in order to lower the resistance in contact with the negative film 2, thereby facilitating the feeding of the negative film 2. The lower ridges 44 and 46 formed on the lower tongue 37b also serve to prevent image receiving areas in the center of the negative film 2 from being scratched by contact with the lower tongue 37b.

Figure 13A:
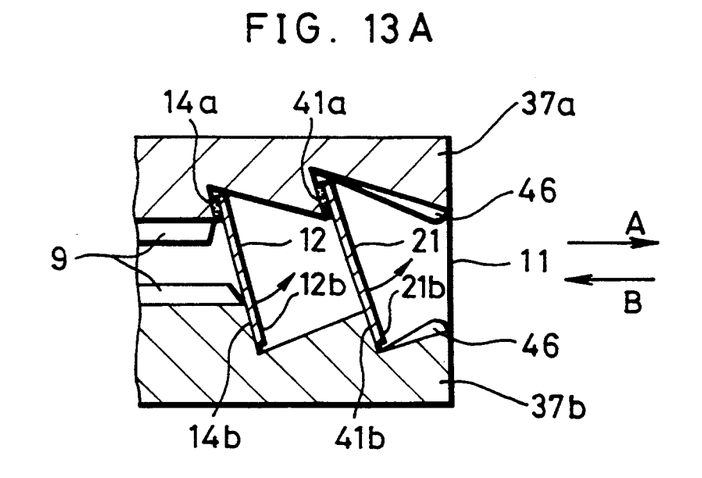
FIGS. 13A and 13B are sectional views of an important portion of a film passageway of the cassette of in FIG. 11.
Figure 14:
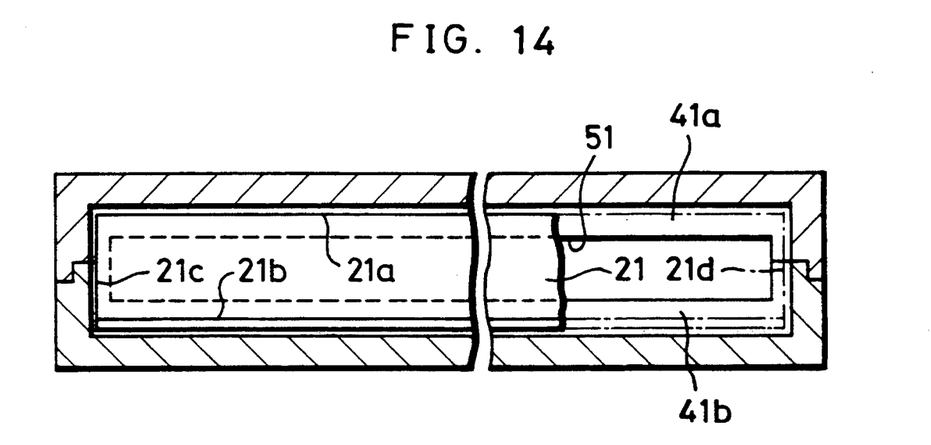
FIG. 14 is an explanatory view schematically shown the film passageway shown in FIGS. 13A and 13B.

As shown in FIG. 13A, attaching surfaces 14a and 41a are formed in the film passageway on the upper tongue 37a of the upper shell half 5a. The light-shielding member 12 is attached to the attaching surface 14a, while the light-shielding member 21 is attached to the attaching surface 41a. The respective arrows A and B indicate the advancement and rewinding directions of the negative film 2. The light-shielding member 12 laps over the attaching and receiving surfaces 14a and 14b along the direction of the arrow B, as shown in FIG. 13A. Similarly, the light-shielding member 21 completely covers a narrowed spacing 51 defined by the attaching and receiving surfaces 41a and 41b, as shown in FIG. 14. Three sides 21b to 21d other than the attached side 21a of the light-shielding member 21 are received by three edges of the attaching and receiving surfaces 41a and 41b. In this manner, the light-shielding members 12 and 21 shield the inside of the cassette shell 5 reliably from light. It is noted that the sectional area of the spacing 13 is determined to be smaller than that of the spacing 51 so as to make advancement of the leading end 2a smooth.

Figure 13B:
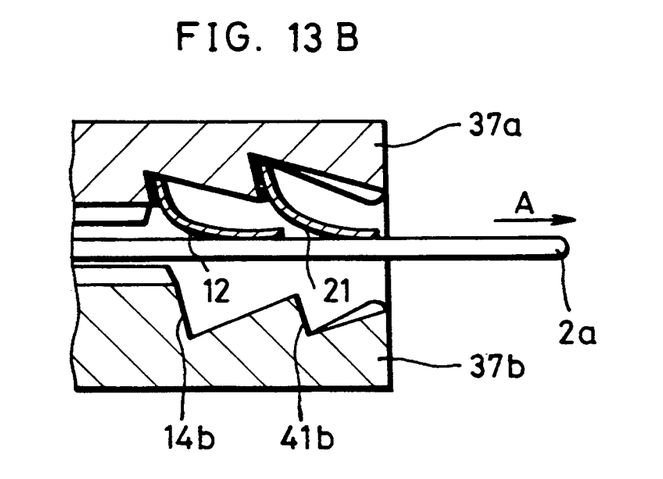

Before advancing the negative film 2 wound on the spool 3 up to the leading end 2a, the light-shielding members 12 and 21 close the narrowed spacings 13 and 51 by lapping over the receiving surfaces 14b and 41b, as shown in FIG. 13A. With the cassette 30 loaded in a camera, clockwise rotation of the spool 3 causes the leading end 2a to advance. The leading end 2a, guided toward the film passage mouth 11 by the separation claw 10, presses and elastically deforms the light-shielding members 12 and 21. The leading end 2a is advanced through the film passage mouth 11, as shown in FIG. 13B. When the negative film 2 is wound onto the spool 3 up to the leading end 2a after taking photographs, the light-shielding members 12 and 21 return to their original shapes to provide a double shield inside the film passage mouth 11, as shown in FIG. 13A.

Figure 15:
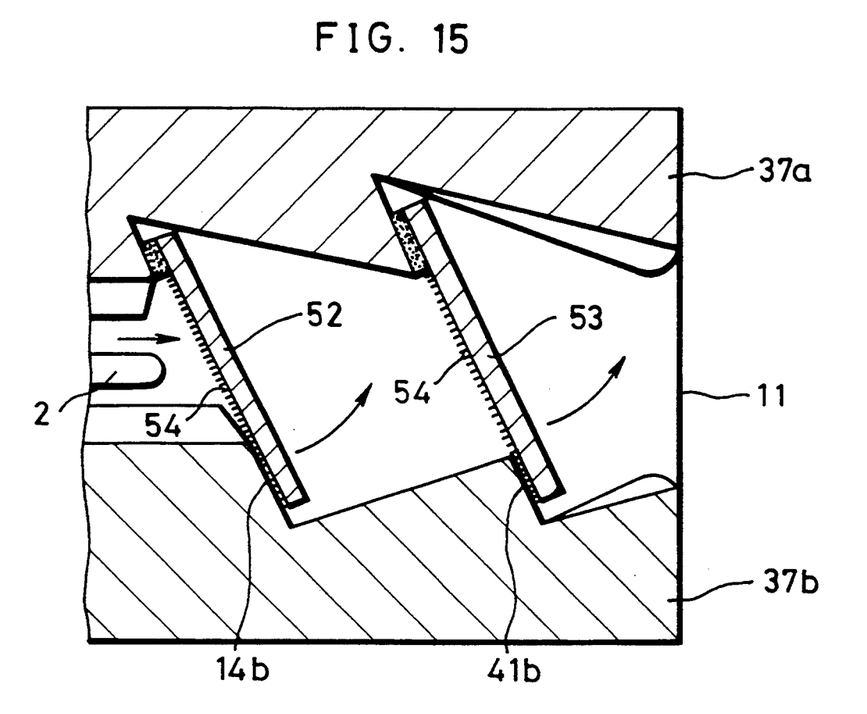
FIGS. 15 to 17 are sectional views of an important portion of a film passageway of cassettes according to yet other preferred embodiments of the present invention.

Referring to FIG. 15, the light-shielding members 52 and 53 may be provided additionally with nap 54 like pile threads by attaching nappy fabric such as nonwoven fabric or velvet thereto, or by directly planting fibers of the nap 54 thereon. The fine nap 54 absorbs and thus traps light coming to the intervals between the light-shielding members 52 and 53 and the receiving surfaces 14b and 41b. The nap 54 also becomes the intermediate between the negative film 2 and the light-shielding members 52 and 53 so as to prevent the negative film 2 from being damaged by contact with the light-shielding members 52 or 53 while advancing or rewinding the negative film 2. The nap 54 can be made from various materials, including: synthetic fibers such as polyester, polyamide, polyacrylonitrile and polyvinyl alcohol; regenerated fibers such as rayon; and natural fibers such as wool and silk. The nap 54 may be planted directly on the light-shielding members 52 and 53 by means of static electricity.

Figure 16:
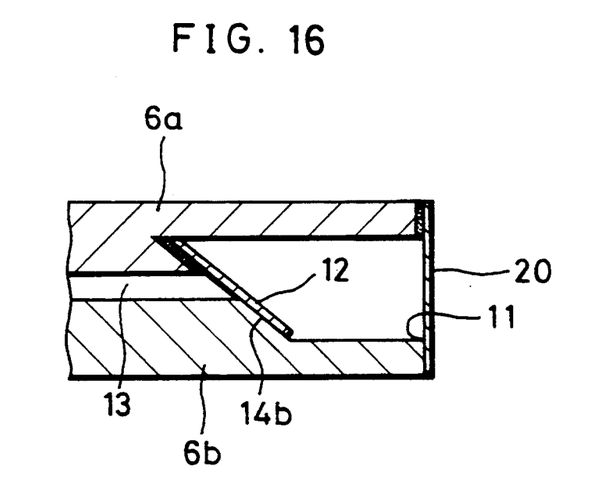

Referring to FIG. 16 showing another preferred embodiment, the film passage mouth 11 is covered by a second light-shielding member 20 attached on the tip of the upper tongue 6a. The bottom portion of the receiving surface 14b is formed linearly on the lower tongue 6b. There is no need to curve the lower side 12b of the light-shielding member 12 constantly in an unused condition, so that it is advantageous that the lower side 12b involves no irrecoverable curling.

Figure 17:
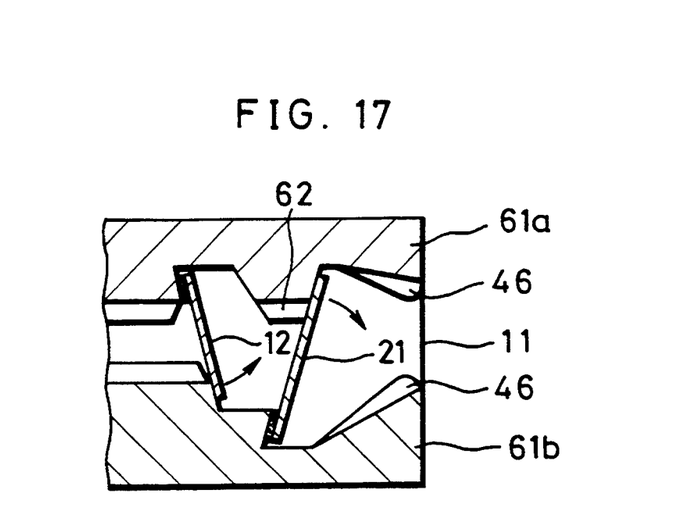

As shown in FIG. 17, the first light-shielding member 12 may be attached to an upper tongue 61a of the upper shell half 5a with the second light-shielding member 21 attached to a lower tongue 61b of the lower shell half 5b. A ridge 62 and a ridge 46 are formed on the upper tongue 61a for lowering resistance of contact with the negative film 2, while the ridge 46 is formed on the lower tongue 61b.

Experiments were conducted on the inventive film cassette having the film passageway shown in FIGS. 13A, 13B and 17 and conventional film cassettes having the film passageway shown in FIG. 18. The spool was rotated in the unwinding direction in a condition in which the film was wound on the spool up to the leading end. The leading end could not be advanced to the outside from the cassette of FIG. 18, while the leading end was advanced smoothly from the cassettes of FIGS. 13A, 13B, and 17.

The cassettes shown in FIGS. 13A, 13B, 17 and 18 were subjected to light of 80,000 lux for two minutes. The film from the cassettes was developed. Although fogging was detected on the film from the cassette of FIG. 18 in a form traversing the film widthwise, no fogging was found on the film from the cassettes of FIGS. 13A, 13B, and 17.

One of the two receiving surfaces 14b and 41b may be omitted, so that the corresponding light-shielding member is in contact with a plane surface on the lower tongue 6b of the lower shell half 5b. The member for pressing the free side 12b of the light-shielding member 12 against the receiving surface 14b also may be a small spring made of metal plate or a sponge-type material made of plastic foam, and may lack a light-shielding property. In addition to the 135-type photographic film cassette, the present invention is applicable to other types of film cassettes such as a 110-type film cassette, and a photographic paper magazine for containing a roll of photographic paper in light-fight fashion.

While the present invention has been described in detail with reference to a preferred embodiment, various modifications within the scope and spirit of the invention will be apparent to those of working skill in this technological field. Thus, the invention should be considered as limited only by the appended claims.

What is claimed is:

1. A photographic film cassette for containing photographic film in light-tight fashion, comprising:
a cassette shell having a film passageway through which said film is fed;
a spool, disposed rotatably within said cassette shell, for winding said film;
a first light-shielding member disposed across said film passageway for shielding an inside of said cassette shell from light, said first light-shielding member being elastic and substantially rectangular, wherein a first side of said first light-shielding member parallel to said spool is attached to an inside surface of said film passageway; and
first receiving means, comprising a first receiving surface formed directly on said film passageway, for receiving at least a second, free side of said first light-shielding member opposite said first, attached side.

2. A photographic film cassette as defined in claim 1, wherein said cassette shell includes upper and lower shell halves separated by two planes, one of which substantially divides said film passageway and a film passage mouth with respect to a passage plane of said film, and said upper and lower shell halves define upper and lower inside surfaces of said film passageway.

3. A photographic film cassette as defined in claim 1, wherein said first receiving means receives two other sides of said first light-shielding member.

4. A photographic film cassette as defined in claim 2, wherein said first, attached side is attached in a recess formed in said film passageway.

5. A photographic film cassette as defined in claim 4, wherein said first light-shielding member comprises a plastic film.

6. A photographic film cassette as defined in claim 4, wherein said film is contained completely in said cassette shell, said cassette further including means for advancing a film leader of said film outside said cassette shell through said film passageway by rotating said spool, said film leader elastically deforming said first light-shielding member to open said film passageway when directed toward said film passageway by said film leader advancing means.

7. A photographic film cassette as defined in claim 6, wherein said leader advancing means includes a separation claw, formed on an entrance of said film passageway, for separating said film leader from said wound film, and an annular ridge formed on an interior surface of said cassette shell for contact with an outermost turn of said wound film.

8. A photographic film cassette as defined in claim 6, wherein said first receiving surface is formed in a stepped shape on said film passageway.

9. A photographic film cassette as defined in claim 8, wherein said first light-shielding member is disposed at an angle such that said first, attached side is disposed toward an interior of said film cassette with respect to said second, free side along said film passageway.

10. A photographic film cassette as defined in claim 9, wherein said first receiving surface is inclined in the same direction as said first light-shielding member.

11. A photographic film cassette as defined in claim 10, wherein said second, free side of said first light-shielding member is curved toward an exit end of said film passageway constituting the film passage mouth, and said first receiving surface is curved in correspondence with said curve of said second, free side so as to be fitted on said second, free side.

12. A photographic film cassette as defined in claim 11, further comprising a pressing member for pressing said first light-shielding member toward an inside surface having said first receiving surface for maintaining contact of said first light-shielding member with said first receiving surface.

13. A photographic film cassette as defined in claim 12, wherein said pressing member is attached to an inside surface to which said attached side is attached.

14. A photographic film cassette as defined in claim 6, wherein said first receiving means receives two sides of said first light-shielding member vertically with respect to said spool.

15. A photographic film cassette as defined in claim 6, further comprising a second light-shielding member, disposed across said film passageway between said first light-shielding member and an exit end of said film passageway constituting a film passage mouth, for shielding an inside of said cassette shell from light, said second light-shielding member being elastic and substantially rectangular, wherein a side of said second light-shielding member parallel to said spool is attached to one of said inside surfaces of said film passageway, said second light-shielding member being elastically deformed to open said film passageway when said film leader is directed toward said film passageway by said leader advancing means.

16. A photographic film cassette as defined in claim 15, wherein said attached side of said second light-shielding member is attached in a recess formed in said film passageway.

17. A photographic film cassette as defined in claim 15, further comprising second receiving means for receiving at least one unattached side of said second light-shielding member.

18. A photographic film cassette as defined in claim 17, wherein said second receiving means comprises a second receiving surface formed in a stepped shape on said film passageway.

19. A photographic film cassette as defined in claim 18, wherein said second light-shielding member comprises a plastic film.

20. A photographic film cassette as defined in claim 18, wherein a spacing defined by said second receiving surface within said film passageway is wider than a spacing defined by said first receiving surface within said film passageway.

21. A photographic film cassette as defined in claim 20, further comprising a ridge formed on said film passageway between said second receiving surface and said film passage mouth for reducing friction between said film and said film passageway.

22. A photographic film cassette as defined in claim 20, wherein said first and second light-shielding members are attached to said upper inside surface.

23. A photographic film cassette as defined in claim 20, wherein said first and second light-shielding members are attached respectively to said upper and lower inside surfaces.

24. A photographic film cassette as defined in claim 15, wherein said second receiving means and an attaching portion for attaching said attached side of said second light-shielding member are formed around said film passage mouth.

25. A photographic film cassette as defined in claim 15, further comprising nappy means, attached to interior surfaces of said first and second light-shielding members with respect to said film passageway, for trapping light and for protecting said film.

26. A photographic film cassette as defined in claim 25, wherein said nappy means comprises a fabric having a nap for trapping light by absorbing light coming toward intervals between said first and second light-shielding members and said inside surfaces.

27. A photographic film cassette for containing photographic film in light-tight fashion, comprising:
 a cassette shell having a film passageway through which said film is fed;
 a spool, disposed rotatably within said cassette shell, for winding said film;
 a first light-shielding member, disposed across said film passageway, for shielding an inside of said cassette shell from light, said first light-shielding member being elastic and substantially rectangular, wherein a first side of said first light-shielding member parallel to said spool is attached to an inside surface of said film passageway;
 first receiving means, comprising a first receiving surface formed directly on said film passageway, for receiving at least a second, free side of said first light-shielding member opposite said first, attached side; and
 a second light-shielding member disposed across said film passageway beside said first light-shielding member for shielding an inside of said cassette shell from light, said second light-shielding member being elastic and substantially rectangular, wherein a side of said second light-shielding member parallel to said spool is attached to one of said inside surfaces of said film passageway.

28. A photographic film cassette as defined in claim 27, further comprising nappy means, attached to interior surfaces of said first and second light-shielding members with respect to said film passageway, for trapping light and for protecting said film.

29. A photographic film cassette as defined in claim 28, wherein said nappy means comprises a fabric having a nap for trapping light by absorbing light coming toward intervals between said first and second light-shielding members and said inside surfaces.

30. An improved film cassette where (a) a cassette shell has a pair of oppositely spaced throat portions defining a film passageway to the exterior of said shell, (b), a spool is supported for rotation in an unwinding direction inside said shell, (c) a convoluted film roll whose outermost convolution is a film leader is coiled about said spool, and (d) a stripper is located immediately inwardly of said passageway to be received between a leading end of said film leader and a next-inward convolutions of said film roll responsive to rotation of said spool in the unwinding direction to divert said leading end into said passageway to permit the leading end to be advanced from said shell, and wherein the improvement comprises:
 said pair of throat portions defining said passageway has a flat surface along one of the throat portions and a flat surface along the other throat portion which are arranged offset, co-planar relation to locate one flat surface inward of the other flat surface but in the same plane; and a resiliently flexible shutter blade has two opposite ends one of which is secured to said one flat surface and the other of which rests freely against said other flat surface to normally block said passageway but to permit said leading end of the film leader to deflect said shutter blade out of its way when the leading end is diverted into said passageway.

31. A photographic film cassette for containing photographic film in light-tight fashion, comprising:
 a cassette shell having a film passageway through which said film is fed;
 a spool, disposed rotatably within said cassette shell, for winding said film;
 a first light-shielding member, disposed across said film passageway, for shielding an inside of said cassette shell from light, said first light-shielding member being elastic and substantially rectangular, wherein a first side of said first light-shielding member parallel to said spool is attached to an inside surface of said film passageway;
 first receiving means for receiving at least a second, free side of said first light-shielding member opposite said first, attached side;
 a second light-shielding member disposed across said film passageway beside said first light-shielding member for shielding an inside of said cassette shell from light, said second light-shielding member being elastic and substantially rectangular, wherein a side of said second light-shielding member parallel to said spool is attached to one of said inside surfaces of said film passageway; and
 nappy means, attached to interior surfaces of said first and second light-shielding members with respect to said film passageway, for trapping light and for protecting said film.

* * * * *